(12) United States Patent
Drinkwater

(10) Patent No.: US 8,174,743 B2
(45) Date of Patent: May 8, 2012

(54) OPTICAL SECURITY DEVICE

(75) Inventor: K. John Drinkwater, Fleet (GB)

(73) Assignee: Optaglio Limited, Hampshire (GB)

( * ) Notice: Subject to any disclaimer, the term of this patent is extended or adjusted under 35 U.S.C. 154(b) by 270 days.

(21) Appl. No.: 12/353,653

(22) Filed: Jan. 14, 2009

(65) Prior Publication Data

US 2009/0316238 A1    Dec. 24, 2009

Related U.S. Application Data

(60) Continuation-in-part of application No. 11/201,834, filed on Aug. 10, 2005, now abandoned, which is a division of application No. 10/312,153, filed as application No. PCT/GB01/02928 on Jul. 2, 2001, now abandoned.

(30) Foreign Application Priority Data

Jul. 3, 2000   (GB) .................................. 0016354.3

(51) Int. Cl.
- *G03H 1/00* (2006.01)
- *G03H 1/22* (2006.01)
- *G02B 5/32* (2006.01)

(52) U.S. Cl. .................. 359/2; 359/15; 359/32; 359/23; 283/86

(58) Field of Classification Search .............. 359/2, 569, 359/15, 32, 23; 283/86
See application file for complete search history.

(56) References Cited

U.S. PATENT DOCUMENTS 4,206,965 A   6/1980 McGrew (Continued)

FOREIGN PATENT DOCUMENTS

WO    WO 93/18419 A1    9/1993

(Continued)

OTHER PUBLICATIONS

Saxby, G., *Practical Holography*, 1988, Prentice Hall International (UK) Ltd., Great Britain, Table of Contents, 10 pages.

*Primary Examiner* — Audrey Y Chang

(74) *Attorney, Agent, or Firm* — Kilpatrick Townsend & Stockton LLP

(57) ABSTRACT

A holographic effect generating structure (HEGS), either stand alone or integrated with a security diffractive image, generates a holographic optically varying image by a process of diffraction of light, this image under white light illumination generates a smoothly and continuously variable structureless optically variable apparent motion effect which moves along a pre-determined track within pre-determined limits, the device characterized that it generates 3 planes of images under white light illumination—an image plane image located at or near the image plane corresponding to the real plane of the device which defines the predetermined movement track of the apparent motion effect and its bounds, a second virtual image plane situated away from the image plane of the device forming a virtual viewing zone corresponding at which an observer would be positioned to observe the visual effect and a third image plane, which defines a region where all the light rays from the image plane artwork to the viewing zone pass through or appear to originate from which defines the defines the viewing track of the apparent motion effect.

24 Claims, 5 Drawing Sheets

U.S. PATENT DOCUMENTS

Figure 1:
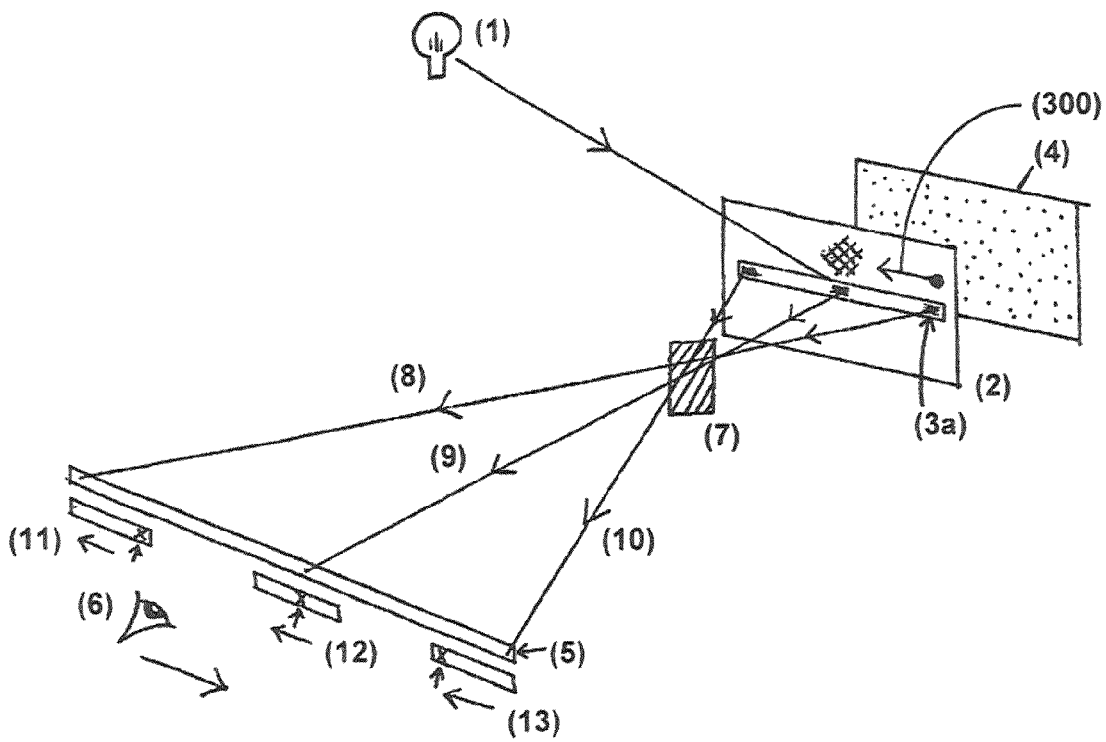

| | | | |
|---|---|---|---|
| 4,544,266 A | 10/1985 | Antes | |
| 4,568,141 A * | 2/1986 | Antes | 359/2 |
| 4,629,282 A | 12/1986 | McGrew | |
| 4,717,221 A | 1/1988 | McGrew | |
| 4,761,252 A | 8/1988 | Siegel et al. | |
| 4,918,469 A | 4/1990 | McGrew | |
| 5,034,003 A | 7/1991 | Denance | |
| 5,101,184 A | 3/1992 | Antes | |
| 5,464,710 A * | 11/1995 | Yang | 430/1 |
| 5,483,363 A | 1/1996 | Holmes et al. | |
| 5,663,815 A * | 9/1997 | Molteni et al. | 359/13 |
| 5,694,229 A | 12/1997 | Drinkwater et al. | |
| 5,991,078 A * | 11/1999 | Yoshitake et al. | 359/567 |

FOREIGN PATENT DOCUMENTS

| | | |
|---|---|---|
| WO | WO 95/02200 A1 | 1/1995 |
| WO | WO 95/04948 A1 | 2/1995 |
| WO | WO 99/59036 A1 | 11/1999 |

\* cited by examiner

OPTICAL SECURITY DEVICE

This application is a continuation-in-part of U.S. patent application Ser. No. 11/201,834, entitled "OPTICAL SECURITY DEVICE," filed Aug. 10, 2005 by John Drinkwater, which is a divisional of U.S. application Ser. No. 10/312,153, entitled "OPTICAL SECURITY DEVICE," filed Apr. 7, 2003 by John Drinkwater (the "'153 application"). The '153 application is a 371 of PCT/GB01/02928, filed Jul. 2, 2001, which claims priority to UK 0016354.3, filed Jul. 3, 2000. Each of the foregoing applications is incorporated herein by reference for all purposes.

This invention is in the field of security anti-counterfeit devices operating on the principle of optical diffraction and relates to an improved form of optical security device for use in the protection of documents and articles of value from counterfeit and to verify authenticity.

Several forms of such devices are now used to prove the authenticity of items of value and to prevent their fraudulent duplication for example for banknotes, plastic cards, value documents such as fiscal stamps, travel documents such as passports and for the authentication of valuable goods.

Devices based on the principle of optical diffraction are often used for these purposes because they can produce, by the process of optical diffraction, an optically variable image with characteristic features such as depth and parallax (holograms) and movement features and image switches (purely diffraction grating devices and some holographic devices). Such diffractive, optically variable image forming devices are used as anti-counterfeit devices both because their effects are highly recognisable and cannot be duplicated by print technologies, and because specific and difficult to replicate optical and engineering techniques are required for their production.

These diffractive optically variable image forming devices are generally manufactured and form their effects base on holographic or pure diffraction grating techniques and are often manufactured as embossed surface relief structures as known in the art (e.g. Graham Saxby "Practical Holography" Prentice Hall 1988). They are typically applied to documents of value, plastic cards and articles of value to be protected in the form of holographic or diffractive hot stamping foil or holographic or diffractive labelling, often tamper evident.

These are various forms of pure diffraction grating devices already revealed and in use as such security devices. One example is known from U.S. Pat. No. 4,568,141, which reveals a diffraction optical authenticating element that provides a colour pattern moving at a predetermined velocity along a predetermined track when the document is illuminated form a first direction and viewed from a second direction. This device consists of a plane diffraction grating structure which defines a predetermined track where at least one of whose spatial frequency or angular orientation varies along said track such that when the device is illuminated and rotated in a plane adjacent region of diffraction grating structure successively diffract light to cause a viewer to see a colour pattern which appears to move along said movement track. Each element of this device is a pure plane diffraction grating—the apparent motion being determined by rotation of grating orientation along the track and/or change of grating pitch. A manufacturing method for such a security diffraction grating master is revealed in U.S. Pat. No. 4,761,252 the technique using a punch to impress successive small areas of a flexible embossing die into a sheet of thermoplastic material. U.S. Pat. No. 5,034,003 reveals another form of optical security device using diffraction gratings to produce a switching image by recording the device as sets of pixels with each pixel consisting of small areas of different grating spatial frequencies and orientations to form a diffracted image visible from different directions. This diffractive image device is designed to create an image displaying a sharp switch between two or more separate graphical images. The teachings of these patents are incorporated by reference. Another form of pure diffraction grating security device and another method of producing the same is to directly write the diffractive structure by use of electron beam lithography—some examples of this are WOA9318419, WOA9504948 and WOA9502200, describing electron beam generated diffractive optical security devices. Again these teachings do not anticipate holographic techniques for creating smoothly changing grating structures to produce smooth apparent movement effects visible to an observer.

Diffractive optical variable image forming devices are also known and have been produced by holographic methods, such devices are known for their use in security applications for example on credit cards, banknotes, etc. Examples of teachings on such holographically manufactured security structures can be found in U.S. Pat. No. 5,694,229, U.S. Pat. No. 5,483,363 and WO9959036. The optical recording and manufacturing methods and other teachings of these patents are incorporated by reference.

Holographic stereograms and their manufacturing techniques have been used for some time for applications like portraiture where many views of a subject (typically 30 to 100+) can be combined within a hologram to produce images containing portraiture and some animation effects. A description of this technique describing a system for synthesising so called lenticular or 'strip multiplexed' holograms can be found in U.S. Pat. No. 4,206,965, detailing how elemental strip holograms can be synthesised from motion picture film of a rotating subject to provide a three-dimensional view and detailing suitable methods. A wider and more general discussion on the field of holographic stereograms can be found in the literature, for example, Graham Saxby, "Practical Holography" Prentice Hall 1988. None of these techniques anticipate the type of optical security technique revealed here.

Another technique known in the field is to create a rainbow hologram that exhibits several different views to an observer on horizontally rotating the device about a vertical axis. This technique involves some modifications at the H1 mastering origination stage where, instead of recording a single discrete rainbow master hologram, the rainbow master hologram is split into several portions corresponding to different exposures and hence able to replay distinct and different images visible to an observer as hologram replays different portions of the H1 rainbow master into the observer's view as the device is rotated. This technique has been used in the art to create holographic images that switch views on left to right tilting, that move through several views on left to right tilting or that can be used for simple animation.

This technique has also been used to produce apparent animation and running effects similar to those displayed by arrays of surface diffraction gratings by organising for example a line or circle of graphics or text and organising different portions of the graphics to be recorded in different portions of the H1 rainbow master slit such that upon re-illumination the replay directions of the various graphical portions co-operate sometimes replaying in a predetermined sequence to produce an apparent rotational or linear movement effect of the replay colour along the line of graphics. Several such variations of this theme have been used in the art for commercially produced security holograms including using a large number of separate elements to try to make the apparent motion more continuous and using half tone artwork separations graded into each other to simulate a zone of continuously variable diffraction or holographic grating.

However, the above holographic technique is limited because it can never produce a completely continuous smooth apparent motion effect because each discrete elemental area is always replaying into a defined discrete portion of the rainbow slit so providing always a discontinuous animation marked by discrete steps and jumps between the various elements as the viewer's eye passes behind them.

Additionally this technique requires the recording of a large number of additional elemental holograms, one per replay element in the motion effect, on any particular H1 intermediate hologram thus adding considerably to the complexity and difficulty of origination. This large and complex number of intermediates also makes it difficult to record several such features in a design without making the origination process prohibitively difficult and complex and subject to errors. The limitations of this approach also means that using conventional holographic techniques it is not possible to match the near continuous colour run techniques that can be produced by for example, dot matrix systems, where the optical replay can be subdivided into very many different angular components due to individual stepwise nature of the dot recording in these systems. Neither can such current security holographic techniques reproduce continuously variable diffraction grating effects (so called 'chirped diffraction grating' where the diffraction grating pitch varies continuously across the area of the grating) seen for example in kinegrams which are produced by continuously changing the orientation of the diffraction grating structure step by step in very many small increments as the device is written using a technique similar to that in U.S. Pat. No. 4,761,252.

The above discussion thus indicates that it would be advantageous to have a new holographic security device to use alone or with other techniques in the field of holographic security origination to augment these limitations of the current art.

Machine readable or coherently viewable holographic or diffractive structures for optical security applications are described in other literature. For example U.S. Pat. No. 4,544, 266 reveals the authentication of a document by the use of a machine readable diffraction based encoded mark that is difficult to copy, and U.S. Pat. No. 5,101,184 describes another way of machine reading a diffractive security device by detecting the different intensities of diffracted light produced in different directions by asymmetric relief structures.

This invention describes a new holographic security device that overcomes the limitations of the previous art in holographic security origination. This device can be used alone or is particularly useful when combined with other holographic security origination techniques to overcome these limitations of the current art and extends its security value and applicability.

Accordingly, the current invention seeks to provide advantages over known such devices and techniques.

According to a first aspect of the current invention there is an optical security device comprising a discrete region containing a diffractive structure arranged to generate a holographic optically variable image comprising a continuously variable arrangement of diffractive spatial frequencies wherein upon illumination by white light the structure generates a visible optically variable image viewable by an observer in which the diffractive replay of the image is characterised by a continuous smooth apparent motion effect observed when the device is tilted, and wherein the said replay occurs in relation to a defined graphical image located at least in proximity to an image plane of the device.

Advantageously, the holographic variable image is produced through continuously variable orientations of the diffractive structure.

According to a second aspect of the current invention there is a method of recording an optical structure on an optical security device and offering holographic artwork and an H1 rainbow slit and including the step of introducing a mask specifically for defining a parallax barrier arranged to be located between holographic artwork and an H1 rainbow slit.

In this invention, a new optical security device for use in security applications is described. This consists of an holographic effect generating structure (HEGS) that generates a holographic optically variable image to provide an apparent motion effect by the process of diffraction of light which consists of a smooth and continuously varying arrangement of diffractive spatial frequencies which upon illumination with white light and observation generates a visually observable optically varying image where the diffractive replay of this image appears upon tilting the device in one axis a continuously varying smooth movement of optical diffraction replay along or though a defined graphical image located at or near the image plane of the device. Another characteristic of this device is that the area within which the HEGS effect moves is defined by the image plane artwork associated with the element, whilst the actual optical replay of the device shows no structure at all save and displays a completely smooth and continuous variation of diffracted replay direction with angle.

In a preferred embodiment of this device, the holographic effect generating structure (HEGS) has a direction of reconstructed light replay which lies in the direction of a projected rainbow slit that would correspond to the full parallax version of the HEGS artwork. This means that the reconstruction is characterised in that as a viewer observes along this projected rainbow slit reconstructed under white light illumination the viewer sees a completely smooth continuous movement of a diffused replay effect moving along a sharply defined track whose edges would be defined by the HEGS artwork. This reconstruction from this new structure and this observed effect is characterised by a continuous change of diffraction grating orientation, a continuous change of diffraction grating and diffractive structure pitch, the complete absence of any observable artwork structure within the structure of the replayed image (i.e. with no component dot or artwork artefacts), and the replay of a small and variable cone of replay directions (as opposed to a pure grating effect), an effect which can be used to alter the apparent width of replayed artwork and its viewing zone and has design advantages in being able to smoothly alter the visual impact of this new effect within a design.

An alternative way to describe this invention is that a holographic effect generating structure (HEGS), either stand alone or integrated with a security diffractive image, generates a holographic optically varying image by a process of diffraction of light, this image under white light illumination generates a smoothly and continuously variable structureless optically variable apparent motion effect which moves along a pre-determined track within pre-determined limits, the device further characterised in that it generates 3 planes of images under white light illumination—an image plane image located at or near the image plane corresponding to the plane of the device which defines the predetermined movement track of the apparent motion effect and its bounds, a second virtual image plane situated away from the image plane of the device forming a virtual viewing zone corresponding to a narrow slit and located where this would normally be positioned) corresponding to the viewing track of an observer's eye when viewing the effect at which an observer would be positioned to observe the visual effect and a third image plane or 'parallax barrier', (which in one embodiment can be located between the image plane artwork and the viewing zone) which defines a region where all the light rays from the image plane artwork to the viewing zone pass through or appear to originate from, which defines the sectors and location of image plane artwork visible through the viewing zone and thus by its position defines the viewing track of the smooth motion effect and by its width defines the view angle or width of the apparent motion effect.

In a preferred embodiment the HEGS is a surface relief structure reflective either by coating with a metal or dielectric layer.

In various embodiment the intermediate image or parallax barrier is a virtual plane which can be located either between artwork and H1 in real image space defining a zone where all the diffracted light rays pass through or the parallax barrier can be located behind the image plane of the device defining a virtual plane through which all the light rays passing between the image plane artwork and viewing zone (virtual projected rainbow slit) would have appear to have originated.

In another embodiment there are several intermediate image zones or parallax barriers defining one or more areas of image plane artwork sub-divided into several apparent motion zones.

In another embodiment of one type of parallax barrier the apparent motion effects are in a direction parallel to the virtual viewing zone normal position of the slit), whilst in another embodiment of the parallax barrier the apparent motion effects are perpendicular to the visual viewing zone (the normal position of the slit).

This invention also related to a novel holographic origination method for the holographic effect generating structure (HEGS).

Prior devices usable for producing a similar but more limited type of effect would include so called 'dot matrix' diffraction grating and kinegrams. In both these effects the structure would at any point be a pure diffraction grating structure or substantially such a structure and would not at any individual point be able to generate a cone of replay directions. For the kinegram the movement effect would be generated by altering the grating orientation of a diffraction grating along a movement track, this could be done in a observable smooth way using the techniques of U.S. Pat. No. 4,761,252, but in this technique it would be awkward to both continuously change orientation and pitch of the diffraction grating. In terms of a dot matrix device, the pattern here is normally recorded by the step-wise recording of a point or dot diffraction grating which is then stepped and repeated across the design. Normally such devices thus have the drawback of having characteristic fine pattern of dots making up the image artwork which also reduces the proportion of effective area useful for diffraction and hence the apparent brightness of such devices beneath the optimum and normally such devices simply rotate the diffraction grating orientation in many small but discrete steps to produce movement effects and have difficulty producing a continuously variable pitch diffraction grating. They are also characterised by each point being a pure diffraction grating without the ability to produce a controlled cone of replay directions.

It is a particular objective of this invention to combine the HEGS devices within rainbow security holograms as known in the art and the manufacturing technique for the HEGS is described that makes the combination of this device with rainbow holographic origination techniques straight-forward. This new combination device of one or more HEGS device with a conventional rainbow hologram would therefore provide a new class of security device enabling security holographic techniques to produce apparent motion and continuously variable diffraction grating effects both broadly comparable in visual impact and apparent motion effects but also with definably different properties and image properties. So the HEGS device in a preferred embodiment could be integrated with a standard security hologram as known in the art or, perhaps also a diffraction grating based optical security device such as 'kinegram' or 'exelgram' as known in the field, to provide an effect with these structures difficult to duplicate using pure diffraction grating based techniques.

An advantage of this new class of device over previous techniques is that the new device produces continuous smooth apparent motion effects visible to an observer under white light illumination upon tilting the device, the effect being characterised by both changes in diffractive structure pitch and orientation, these movement effects being of a continuous non-step-wise nature and of a finer resolution in angular movement terms (really truly continuous) than effects attainable with previous techniques.

In one preferred embodiment several such devices could be arranged together in a security device in one preferred case associated with the same graphical image repeated several times on a visual security device each repeated image exhibiting either the same optical performance in terms of apparent motion effects in one preferred embodiment. This repetition would provide some utility for security purposed in terms of making the device more resistant to crumple effects when, for example, used as a security device for frequently handled documents such as banknotes where crumple resistance and wear resistance is desirable.

In another embodiment different graphical features on the visual security device could have the same apparent movement effects.

In another preferred embodiment different graphical images, at least two in number and possibly more, on the visual security device would have different optical performance in terms of apparent motion effects. This is a particularly useful embodiment as the invention disclosed here makes the manufacture of such a complicated device much more straightforward than using previous techniques which would be very time-consuming and complex especially in the case where several different graphical areas in the device had different visual effects in terms of optical apparent motion effects. A particularly useful arrangement for a visual security device, is where two graphical (optionally co-located) images in a visual security device are organised by use of this technique to have contra-propagating apparent motion effects to provide a visually powerful public recognition feature and a type of device very difficult and complex to create using prior techniques. These devices could of course be repeated and arranged in groups.

In all of the above embodiments, although these optical structures could be used as a separate stand alone feature, or indeed a plurality of such features, a useful and preferred arrangement is where this device is integrated with another diffractive security feature such as a diffraction grating device, dot matrix device or security hologram.

A particularly preferred embodiment is where the device is integrated with a security rainbow hologram as known in the art as this device improves dramatically the ease and complexity of addition of diffraction grating based apparent motion optical security features to such security holograms and so significantly adds to the security of such holograms. Such holograms are typically manufactured using the H1-H2 process as known in the art and this technique significantly adds to the security and makes the origination process to achieve a given level of security in terms of complexity and difficulty of re-origination.

Typically security holograms will be originated in a holographic laser laboratory using the known H1-H2 process using on of two main techniques. In one process several independently recorded H1's and a sequential transfer process to record the H2 final image plane hologram by recording the component from each individual H1 separately using a different reference beam for each component exposure to form a final image by superposition of these on the final recording material. In another technique several elemental H1 component holograms each corresponding to a part or separate colour separation of the main image are recorded onto different areas of one intermediate H1 holographic plate to form a complex multi-H1 intermediate that can then be used in a one step second stage transfer process to produce the finished H2 hologram. In both these techniques, but particularly the second, this new technique has advantages in terms of dramatically simplifying the process of incorporating multi-element apparent movement techniques and in additionally providing a new form of optical security effect not obtainable with current techniques.

It is also an object of this invention to provide a optical security image device for public recognition that, particularly when combined with existing holographic security origination techniques, is significantly more secure and difficult to counterfeit or remanufacture than the previous systems. One important objective for this was that the new optical security device when used in combination with holographic security origination should be straight-forward to integrate into these production techniques and should appear to be an integrated part of the security image, for example used to provide continuously changing apparent movement effects thus adding to the overall security and visual public recognition value of the device, additionally requiring more sophisticated origination techniques for manufacture and thus making counterfeit and copying more difficult.

By holographic effect generating structure we refer to a diffractive surface relief structure which would normally be metallised to provide a reflective surface relief structure which consists embossed holographic or diffraction grating structure as known in the art which generates a holographic optically variable image—for example a security hologram—where in one technique the master image has been recorded using a holographic H1-H2 process. In other known embodiments the metal reflector layer can sometimes coated with for example high refractive index dielectric material or set of thin film layers of such materials to provide an optical interference effect where the whole effect is designed to provide a semi-transparent see through effect for data protection purposes, etc. In one preferred embodiment of this invention these special holographic structures would be combined as one component of a main holographic security image containing a mixture of rainbow holographic and purely diffractive elements. Suitable structures, in some respects superior, can also be manufactured by calculation and direct writing of the holographic fringe structure using lithographic techniques and particularly electron beam techniques as known in the art. These special holographic structures could also be combined (for example using a mechanical recombination process) with other pure diffraction grating based devices as known in the field such as, for example, a "kinegram" or a computer calculated and direct written diffractive structure recorded by for example an electron beam lithography system such as the device known as an "Exelgram".

Another useful and preferred form of diffractive surface relief structure usable for generating this type of effect would be an equivalent structure generated by the technique of electron beam lithography, where a computer is used to pre-calculate the microscopic diffraction grating structure which is then directly written into a photoresist recording medium. In a preferred and more secure form of the device when generated by electron beam techniques the projected image could be non-symmetric about the axis by the use of pre-calculated computer generated techniques and direct writing of the structures by, for example electron beam techniques, to generate asymmetric structures, where the covert coherently viewable image only replays one diffraction order substantially and so has a replay that is not symmetric about the specular reflection and thus of an increased security value against holographic counterfeit by re-origination of the structure. A particularly useful method for generating electron beam generated structure of the correct replay property is to form repeated groups of pixels or other shapes consisting of groups of very similar diffraction gratings, varying slightly in pitch and orientation between them, and arranged to generate the designed covert out of plane image by the superposition of their diffracted replays.

By the term linear structure as above in a usual embodiment of this device the line width would be constant, and very small compared to the length and generally the line would be continuous. However, we would also anticipate linear widths of variable thickness along their length that may be particularly suitable for certain applications of the device for example when a hot stamping foil diffractive device is blocked onto rough paper (e.g. banknote paper) where it may useful to vary or thicken the line width locally to localise the patterns more to reduce degradation due to surface roughness or where the line is occasionally broken for example at interlocks and cross-over points with other graphics or to form a dashed line shape, for example—again where the device is substantially linear with small breaks of size comparable only to the line width. It should also be appreciated that the linear structures may be in the shape of lines, curves, circles or other suitable shaped graphics characterised that the structure is made up of a linear region within the dimensions given whose length is substantially greater than its width.

It should be appreciated that the scope of this invention is not just limited to surface relief embossed diffractive structures, but that the concept described herein of discrete line structure regions in a security device forming additional covert coherently viewable images formed at a distance from the device is equally applicable to other forms of holographic techniques such as reflection holography, based on interference layers, manufactured in such materials as photopolymers, silver halide, dichromated gelatin, etc. these applications and methodologies are included within the scope of this invention.

It should be appreciated that in a preferred embodiment the holographic effect generating structure (HEGS) would be integrated as part of a main visual holographic or diffractive security image, typically and preferentially a surface relief image, both to increase the complexity of the overall structure to increase its anti-counterfeit properties and also to conceal the presence of this new structure.

A useful and preferred embodiment of this invention is where the device consists of more than two linear regions of HEGS with different characteristics and preferably several or many more such regions. Preferably but optionally such structures would be integrated with standard security holographic or diffraction grating techniques. The arrangement of such structures in terms of the visually viewable image plane artwork defining the area that the HEGS pattern moves through could be in the form of an array of graphical structures and possibly in one embodiment arranged as a set of line patterns, concentric rings, interlocking guilloche patterns, containing perhaps more than one HEGS effect, such as apparent horizontal motions in opposite directions on tiling, contra propagating vertical motions to visually emphasise the movement effects or a combination of both horizontal, vertical and other suitable apparent motion effects, the intention being to provide an effect with both an intensity and visual performance not accessible with other particularly holographic techniques. It will be appreciated to those familiar with the field that a HEGS device when recorded as one component of a security rainbow hologram could either have a similar or different diffraction grating carrier spatial frequency as the rainbow holographic elements thus imparting either the same relative holographic replay 'colour' as the other elements depending on the design.

A particular advantage of this device is that it allows holographically generated structures to demonstrate a combination of smooth varying apparent movement effects moving within sharply defined artwork features such as conventional artwork, guilloche, etc.

The HEGS device provides not only a higher security and more memorable covert feature than previous devices especially as one component of a holographic image but is also significantly more difficult to back engineer than previous devices as each part of the several components of the optical microstructure would effectively replay an image containing three focal planes; The first focal plane will contain a first visual image located at or near the real physical plane of the device for visual viewing within which the movement effect occurs and which defines the limits of the movement effect on the image plane; The second focal plane will be far from the image plane defining the position of the rainbow slit and the intermediate H1 position, which when the structure is combined with a rainbow security hologram will typically also correspond to the slit distance but not precise position of the other rainbow slits for other components of the image; The third focal plane defines the intermediate visual parallax barrier arrangement, this can be located as a real plane between the image plane and the plane of the slit or a virtual image plane behind the real image plane.

The visual parallax barrier will be located in a position where to a visual observer of the visual image under normal white light illumination the effect of the barrier to define the viewing zone and movement effect of the HEGS whilst the barrier itself is substantially non-visible visible by virtue of either the barrier being located relatively far from the image plane of the hologram such that it is substantially blurred by chromatic aberration to blur out the definition of the barrier. This distance will depend on the size and nature of the barrier and size of the image plane HEGS artwork—a typical distance for a small hologram (typically up to 25×25 mm, where the HEGS extended over a substantial part of this distance) and narrow barrier would be 20 mm to 25 mm from the image plane which would be sufficient to blur out the edges of the barrier to an observer. For a larger hologram a greater distance may be required for the barrier to become non-visible as under diffused light which would simultaneously reconstruct many viewing directions from the device a larger distance may be required. Similarly for small artwork HEGS elements, typically 5 mm and perhaps with several such elements grouped together in a design, then the barrier distance in this case need only be a distance away of the order of the maximum artwork dimension as the artwork barrier will be significantly less noticeable and have a much reduced visual impact for an observer when seen in the context of a small element in a larger design.

A typical general rule for spacing between barrier and image plane artwork is that the barrier position will be determined by the geometry between the image plane artwork and H1 rainbow slit to produce an apparent movement effect in the final design across the desired view angle corresponding to a given geometrical size on the H1 rainbow slit plane. Typically, to distinguish this technique from multi-plane so called 2D/3D holograms as known in the field, the distance between image plane artwork and barrier will be greater than the distances normally used in typical small security holograms (e.g. up to 20×20 mm) for depth effects where a depth element would normally be a distance of less than 6 mm from the front plane elements in a design to reduce blur. Another distinguishing factor with the parallax barrier effect is that it is a second piece or artwork or artwork masking specifically designed with the geometry of artwork and H1 to cooperate with the image plane artwork to produce an apparent movement effect.

Figure 3:
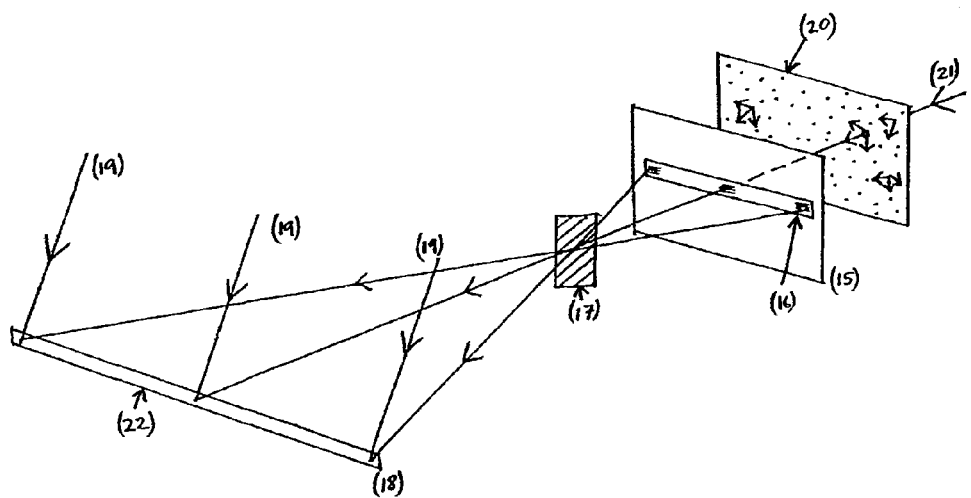
Figure 4:
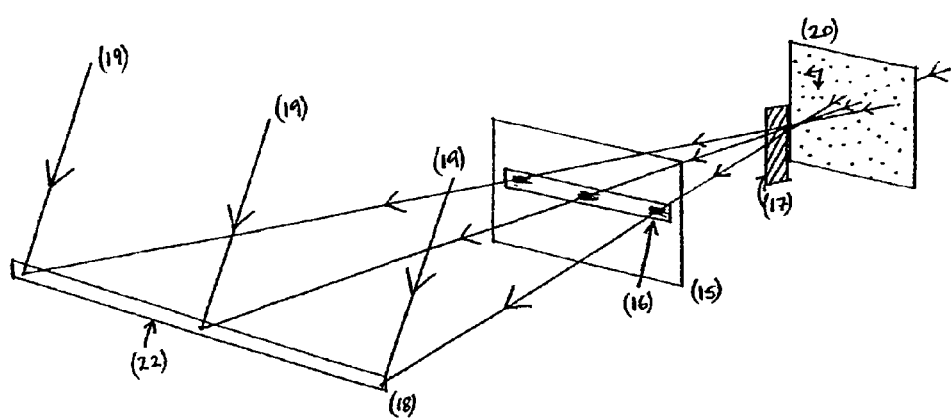
Figure 9:
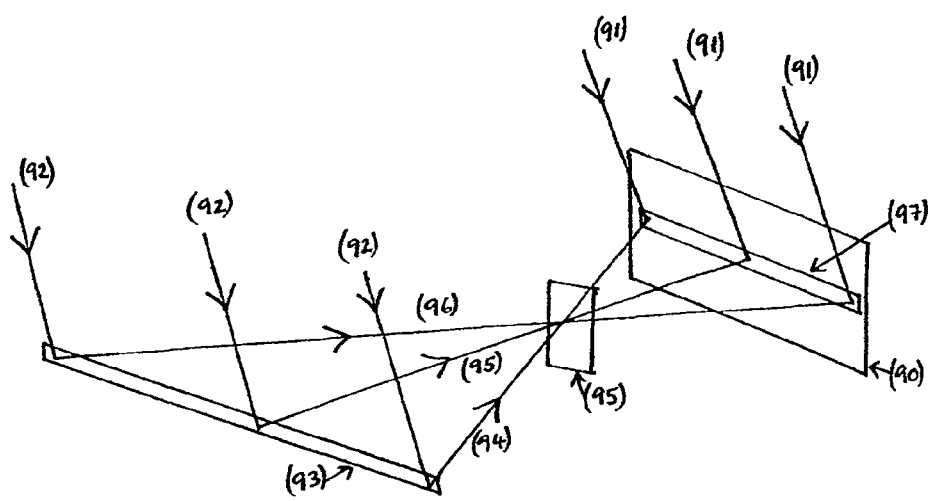

To originate a HEGS device a method based on an extension of the known H1 to H2 technique is proposed and further explained in the figures below. In the holographic field a known recording process for an H1 intermediate is to illuminate an artwork transparency with diffused laser light whilst an intermediate rainbow holographic master or H1 is positioned so as to receive and record light from the desired artwork in the design configuration in order to obtain the correct design movement effect. The H1 is then additionally illuminated with a reference beam in order to make a holographic recording. To record the HEGS an additional mask defining the parallax barrier is introduced into this system either between the holographic artwork and the H1 or between the diffuser and the holographic artwork. These H1 recording arrangements are shown in FIGS. 3 and 4, and FIG. 9 shows the H2 transfer process applicable to this device.

The nature and position of this barrier will be calculated and determined by several design factors such as:

Direction of apparent movement will be determined by the position of the barrier: The direction of motion of the apparent movement effect seen by a observer as the HEGS is rotated about a vertical axis under white light illumination for an effect moving parallel to the long axis of the rainbow slit will be in the same direction as the movement of an observer's eye behind the virtual projected rainbow slit when the parallax barrier is behind the image plane, and in a contra direction to the observer's motion when the parallax barrier is between the artwork and the H1.

View angle of apparent movement and speed of apparent movement motion will be determined by varying the distance between the parallax barrier and the image plane holographic artwork for a fixed H1 to H2 dimension—a larger distance will provide a smaller overall view angle on the effect but a faster motion with rotation over this dimension.

The width of the observed apparent motion effect at any one point, effectively the viewing cone over which any element of the apparent movement effect replays and so the width of the observed movement line will be determined by the width of the barrier.

Figure 7:
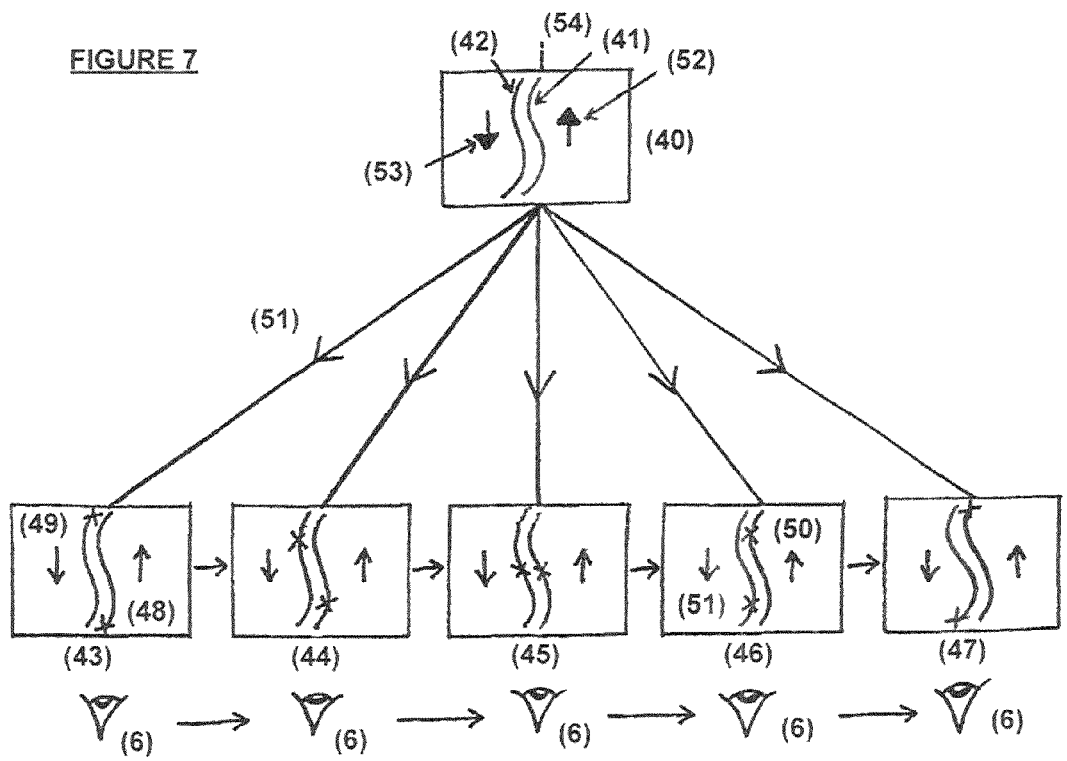

Number of elements—for a multi-element HEGS device as shown in FIG. 7, the parallax barriers will be matched to each corresponding piece of artwork which would generally be much smaller in dimension than for larger movement dimension effects and would be located closer to the image plane of the device probably spaced away from the corresponding piece of artwork by a distance of the order of the largest artwork dimension.

Once the elements of H1, parallax barrier, holographic artwork and diffusion screen have been suitably arranged the holographic exposure would be made in the normal way. For a typical security hologram several component elements of rainbow holograms, HEGS and other features could be combined by successive exposure of different areas of a single H1 to form a multi-component H1 or by successive exposure of several separate H1's recombined later at the transfer stage by successive exposure. After exposure and processing the white light viewable image plane hologram is produced by a standard optical transfer arrangement by re-illuminating the H1 with a conjugate reference to reconstruct a real projected image onto another recording medium, typically a photo resist medium for embossed holography, which is then used as an object for a second or H2 holographic exposure produced by introducing a second reference beam and making a second recording. Typically for a security hologram the H1 would be a multi-component hologram where all of the various colour and movement components of a complex security hologram are recombined in the H2.

It should be appreciated that the technique of inserting an extra mask to form a parallax barrier in the recording process is most flexible and useful when performed at the H1 recording stage of the process as above. However, certain embodiments of the HEGS device detailed here can be originated using different techniques and geometry and these are also incorporated as part of this invention. One alternative more limited technique for achieving more limited effects is to interpose a parallax barrier between the H1 and H2 recording medium. This method would also be applicable to the case of recording image plane 2D rainbow holograms using some of the various masking techniques as known in the art where a recording medium is masked close to its plane and exposed to a linear diffuser as an apparent rainbow slit (e.g. U.S. Pat. No. 4,918,469, U.S. Pat. No. 4,717,221, U.S. Pat. No. 4,629,282) where the barrier would be interposed between the diffuser and recording medium to provide effects.

This invention will now be illustrated with the help of schematic drawings to explain preferred embodiments and potential manufacturing methods.

FIG. 1 illustrates the visual properties of one form of the device, potentially as integrated as part of another diffractive security device such as a hologram, where the smooth continuously variable apparent movement effect runs in a direction contra to the viewer's movement when looking through the virtual projected rainbow slit. The figure illustrates the visual behaviour of the device under white light viewing by an observer, showing one potential movement effect and the position of the virtual reconstruction of the parallax barrier for this effect.

Figure 2:
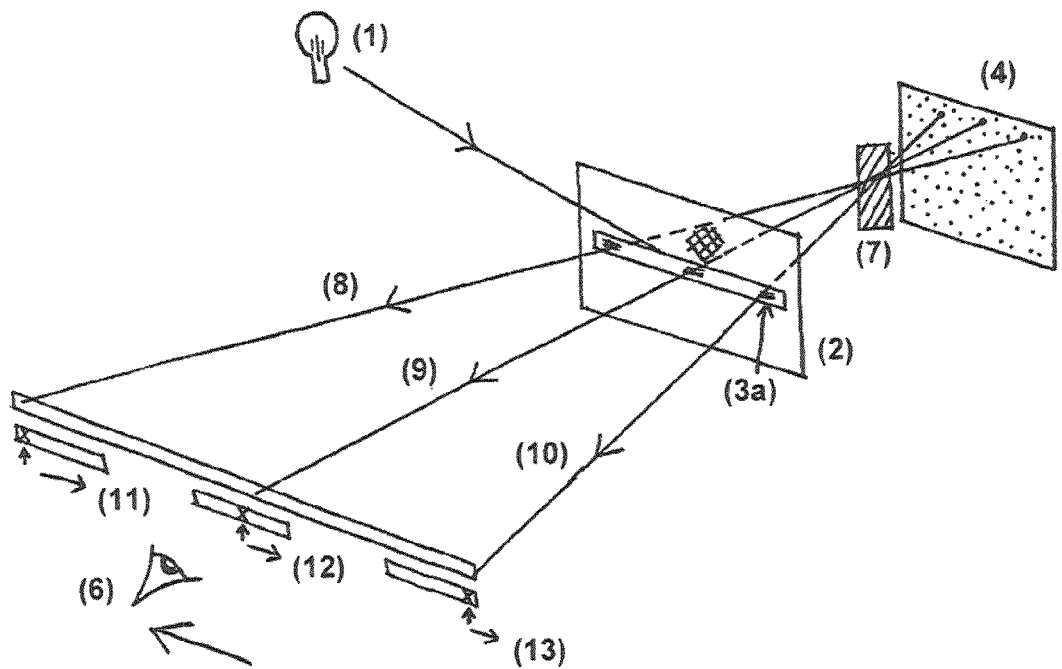

FIG. 2 illustrates the replay of an alternative form of the device under white light illumination where the smoothly moving continuously variable visual effect runs with the direction of the viewer's movement along the projected rainbow slit for observation. This device reconstructs an alternative movement effect created from an alternative form and position of the virtual parallax barrier viewing window projected into space.

FIG. 3: illustrates a recording geometry for the device of FIG. 1 showing a recording geometry for an H1 for this type of device and movement effect with a contra direction of apparent motion using the parallax barrier between the H1 and the artwork.

FIG. 4 illustrates an alternative arrangement of barrier and recording geometry to produce the device with a movement effect as in FIG. 2 showing a parallax barrier placed between the rear diffuser and the artwork.

Figure 5:
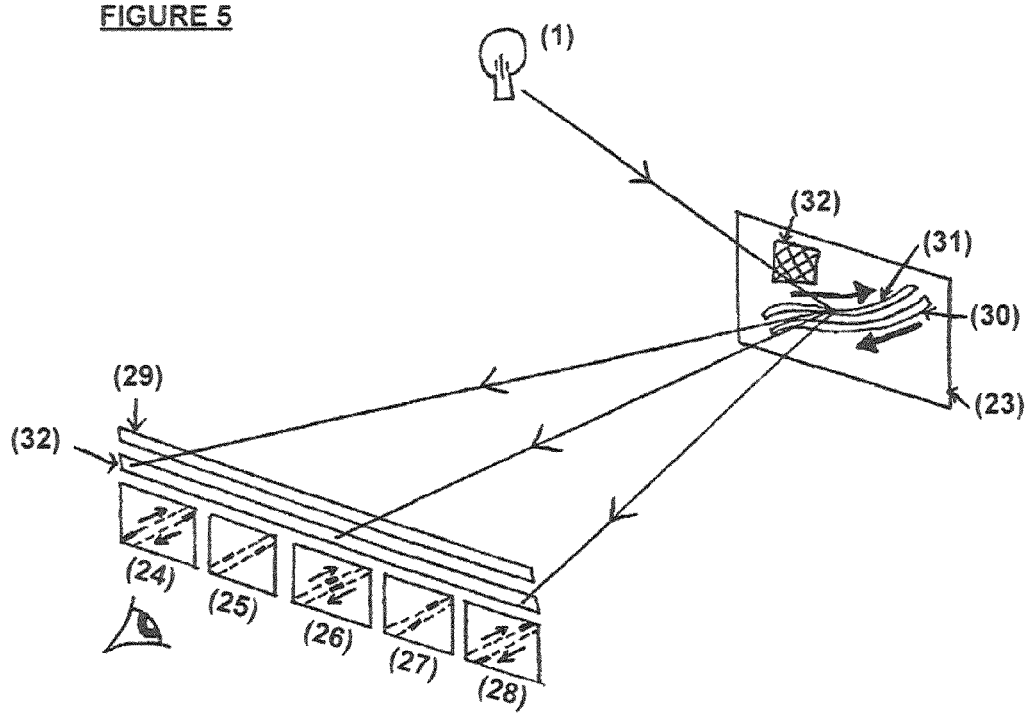

FIG. 5 illustrates a useful form of device made using two different HEGS's made using the geometries of FIGS. 3 and 4, showing how a white light replay effect containing two contra motions can be created. This would add to the visual impact and public recognition security value of the device and would also add to the difficulty of back engineering. This illustration also shows how such devices could be integrated into security holographic or OVD designs.

Figure 6:
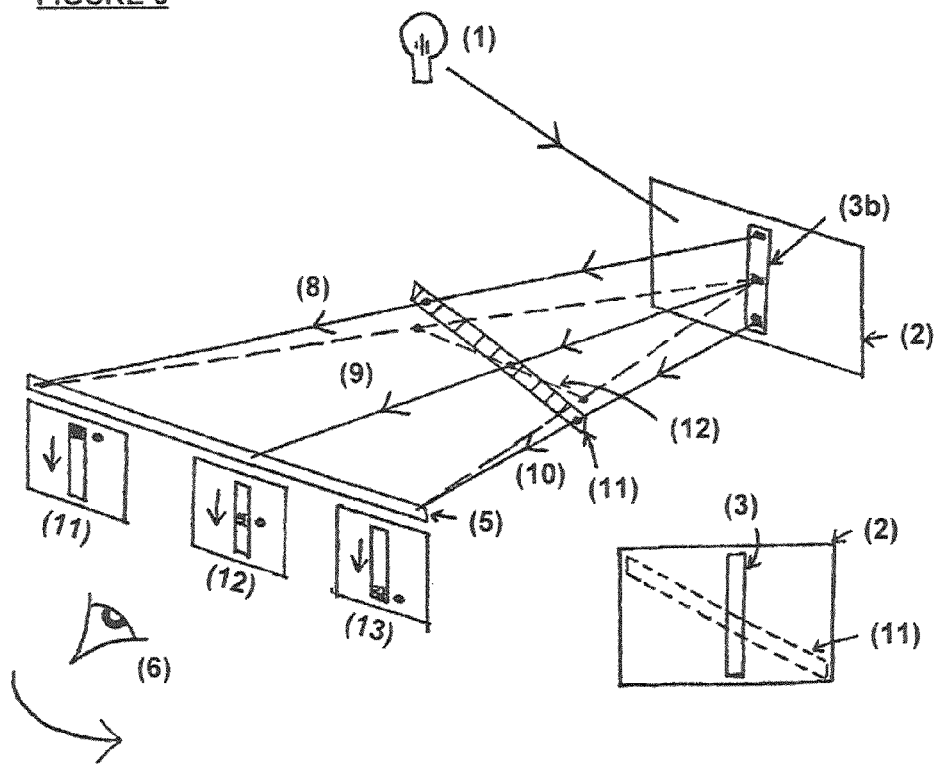

FIG. 6 show how a movement of an apparent 'vertical' motion in a direction perpendicular to the rainbow slit can be created using another alternative arrangement for the parallax barrier. The detail illustrates how the artwork and the parallax barrier relatively overlap as viewed from the H1 to achieve the desired effect.

FIG. 7 shows how two devices can be combined, both illustrating vertical motions but with alternative orientations of parallax barrier and H1 and artwork to produce one movement effect up the design and one movement effect down the design tilting the HEGS device. The illustration shows the various effects a viewer would see on tilting from left to right as an observer moved their eye through the viewing rainbow slit zone.

Figure 8:
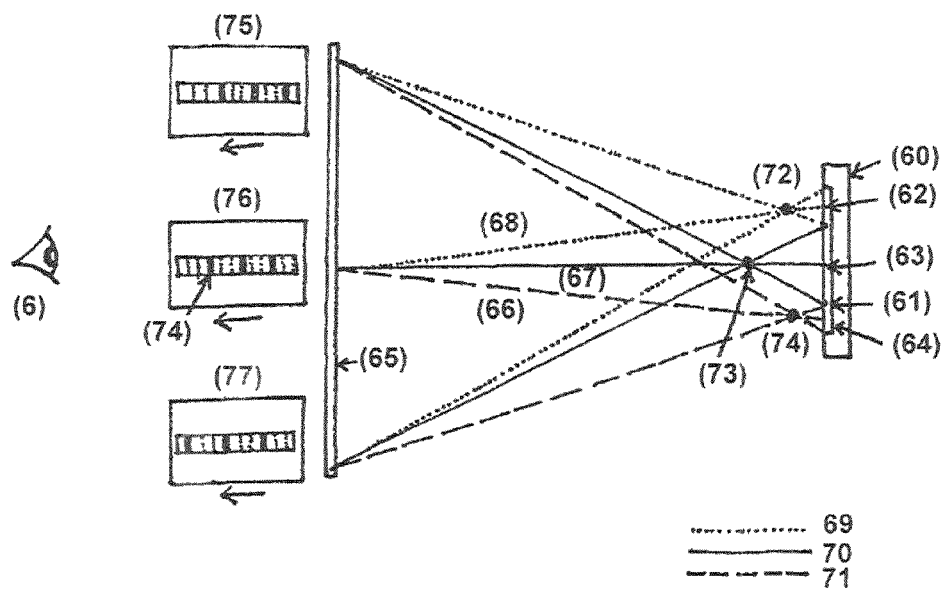

FIG. 8 illustrates how several parallax barriers could be used in combination to produce a more complex effect by extending the recording geometry arrangement of FIG. 3. The type of effect this would produce is shown, consisting of multiple bands of continuous movement effects moving along a defined zone of artwork, each band corresponding to an elemental parallax barrier.

FIG. 9 shows the second stage of a potential manufacturing process following on from FIG. 3 showing how an H2 image plane hologram could be recorded by re-illumination the H1 recorded using the geometry of FIG. 3. Here a real image would be projected from the H1 and used to record a second image plane hologram suitable for white light viewing using one potential manufacturing process known as the H1 to H2 recording process for manufacturing a 'Benton' or rainbow hologram as known in the art. The position of the projected parallax barrier defining the position all of the rays pass through is shown.

The figures will now be explained in more detail:

FIG. 1 illustrates schematically a device (3a), potentially as integrated as part of, but occupying a substantial region of, another diffractive security device such as a security hologram (2) and illustrates its behaviour under white light illumination form a spot light or other similar source (1) where the device replays for observation by an observer (6) a virtual rainbow slit (5) sequence of linear visual images (11,12,13) illustrating a defined continuous movement optical event, in this case a smooth movement along a defined line (3a). Here the movement effect (11,12,13) runs in a direction contra to the viewer's movement when looking through the virtual projected rainbow slit (5) due to the position of the virtual reconstruction of the parallax barrier (7) for this effect between the image plane of the device (3a) and the virtual rainbow slit (5), where the parallax barrier defines a narrow virtual aperture through which all light rays from the artwork (3a) to the viewing zone (5) are constrained to pass thus defining the motion effects (11,12,13) by geometry. The device (3a) also reconstructs behind it a virtual image of the original diffuser (4). The device (3a) is normally located at or near the image plane of the final optical variable device mainly in order to keep the track artwork defining the motion track for the parallax barrier sharp and free from chromatic aberration due to dispersion. However, this is not a limiting condition and the parallax barrier effect can also be used for producing movement effects for non-image plane features with true depth. As shown, the security device can also include a further hologram (14) or graphical motif present to offer a further degree of security.

FIG. 2 illustrates the replay of an alternative form of the device (3a) under white light illumination (1) where the visual effect (11,12,13) runs with the direction of the viewer's movement (6) along the projected rainbow slit (5) for observation. This alternative effect is due to the position of the parallax barrier behind the image plane of the device (2), and in fact behind the device itself in the case of a non-image plane device, to produce a contra motion effect. This device thus reconstructs an alternative movement effect created from an alternative form and rear position of the virtual parallax barrier viewing window defining the accepted light ray paths.

FIG. 3: illustrates a recording geometry for the device of FIG. 1 showing a recording geometry for an H1 (22) for this type of device and movement effect with a contra direction of apparent motion using the parallax barrier (17) located between the H1 and the artwork (16) located in this case on the designed image plane of the device (15). The image plane artwork for the device (16) is illuminated with laser light (21) passed through a diffuser (20). The light from this object passes additionally through a parallax barrier (17) which blocks certain light rays and constrains the light rays that actually reach the H1 to determine the final effect of the device. The H1 is exposed to the object beam light that has passed both through the artwork and been constrained by the parallax barrier and is also exposed to a reference beam (19).

FIG. 4 illustrates an alternative arrangement of parallax barrier (17) and an alternative recording geometry to FIG. 3 which produces a device with a movement effect in the same direction as the observer's motion as shown in FIG. 2. In this case the recording geometry required to produce such a device requires a parallax barrier between the image plane artwork defining the movement track (16) and the illuminating diffuser (20). The steps of recording are otherwise similar to FIG. 3.

FIG. 5 illustrates a useful form of device (30,31) integrated for example with a security hologram (23) made using two HEGS's of different movement properties made using the geometries of FIGS. 3 and 4, showing how a white light replay effect containing two contra motions (24,25,26,27,28) can be created. This would add to the visual impact and public recognition security value of the device and would also add to the difficulty of back engineering. This illustration also shows how such devices could be integrated into security holographic or OVD designs. These illustrations also showing how animation effects (24,25,26,27,28) and optical events generated by this new form device can be aesthetically designed in to add additional optical effects to the main device. This is a significant advantage enabling this new device to add security to the device because it would be complex to back engineer, aiding in public recognition by adding an addition highly visible public recognition feature to the existing security device and security image (32).

FIG. 6 shows how a movement of an apparent 'vertical' motions in a direction perpendicular to the rainbow slit can be created using another alternative arrangement for the parallax barrier. Here the parallax barrier (11) lies in a tilted line between artwork (3b) and rainbow slit (5) defining which components of a vertical line pattern in the movement track artwork (3b) reach the viewer. The detail shows how the relative arrangement of artwork (3b) and parallax barrier (11) for this type of effect is organised, showing how on moving from left extreme view (11) to right extreme view (13) the parallax barrier does not run parallel to the H1 or rainbow slit but is deliberately skewed to control different vertical views of the artwork impinging on the H1 and hence the rainbow viewing slit (5). It can also be appreciated that in other embodiments of this invention this parallax barrier need not necessarily be linear in form and could therefore be used to control different rates of apparent motion in different areas of artwork (if curved) and can also be off-centre at the cross over point with the centre view of the artwork/rainbow slit geometry to offset the centre view position of the device.

FIG. 7 shows how two vertical apparent motion devices (42,43) can be combined, both illustrating vertical motions but with alternative orientations of parallax barrier and H1 and artwork to produce one movement effect up the design and one movement effect down the design tilting the HEGS device. The details (43,44,45,46,47) illustrates the viewers image of the replay form the structure (42,43) showing a sequence of the various views which would be seen by a viewer (6) at various angles on rotating the device around a vertical axis (54), so tilting the device from left to right causing the observer to move their eye through the viewing rainbow slit zone. One movement effect would be up (52) whilst the other movement effect would be down (53) producing an effective public recognition security feature.

FIG. 8 illustrates how several parallax barriers (72,73,74) could be used in combination to produce a more complex effect (75,76,77) by extending the recording geometry arrangement of FIG. 3. The type of effect this would produce is shown, consisting of multiple bands (75,76,77) of continuous movement effects moving along a defined zone of the artwork (62,63,64), each band corresponding to an elemental parallax barrier (72,73,74). In this case a set of parallax barriers (72,73,74) are placed between artwork (60) and rainbow H1 and hence reconstructed rainbow slit defining viewing zone (65). The dotted, dashed and full lines (69,70,71) show the three different light ray paths for the three motion zones as seen from three portions of the rainbow slit to show how the different views recorded at different angles are built up (75, 76,77).

FIG. 9 shows the second stage of a potential manufacturing process following on from FIG. 3 showing how an H2 image plane hologram (90) could be recorded by re-illumination of the H1 (93) using a reference beam (92) conjugate to the original recording beam recorded using the geometry of FIG. 3. Here a real image (97) would be projected from the H1, showing the different light ray paths (94,95,96), which would be used to record a second image plane hologram (90) suitable for white light viewing by adding a second laser reference beam (91) for the H2. All rays (94,95,96) would pass through the position of the reconstructed image of the parallax barrier (95) which constrains the range of possible rays reaching the H2 to define the movement effect. This thus uses one potential manufacturing process known as the H1 to H2 recording process for manufacturing a 'Benton' or rainbow hologram as known in the art. The position of the projected parallax barrier defining the position all of the rays pass through is shown (95) constraining the viewing angles for the H2.

In this adapted H1-H2 recording technique envisaged to produce the HEGS devices as shown in FIGS. 3,4 and 9, the projected image (97) is focussed at or near the plane of a second recording medium (90) according to the type of image plane and movement and depth features required, the second recording medium (90) being typically for an embossed hologram or diffractive element a material capable of recording a diffractive image as a surface relief structure and would typically be a photoresist material. A second reference beam is then introduced (91) to record a second or H2 hologram. It can be appreciated that several such devices can be superimposed or recorded adjacent to each other and that one H1 containing several such recordings or several H1's or a mixture of projection and other masking techniques as known in the art (e.g. U.S. Pat. No. 4,918,469, U.S. Pat. No. 4,717,221, U.S. Pat. No. 4,629,282). To form an embossed hologram the H2 hologram formed in photoresist would be silvered to deposit a conductive layer, copied probably several times in a plating process as known in the field to form metal copies of the structure and then roll embossed into a plastic material or embossing lacquer or hot foil material or similar or similar and then metallised to form an embossed hologram as known in the art.

Figure 10:
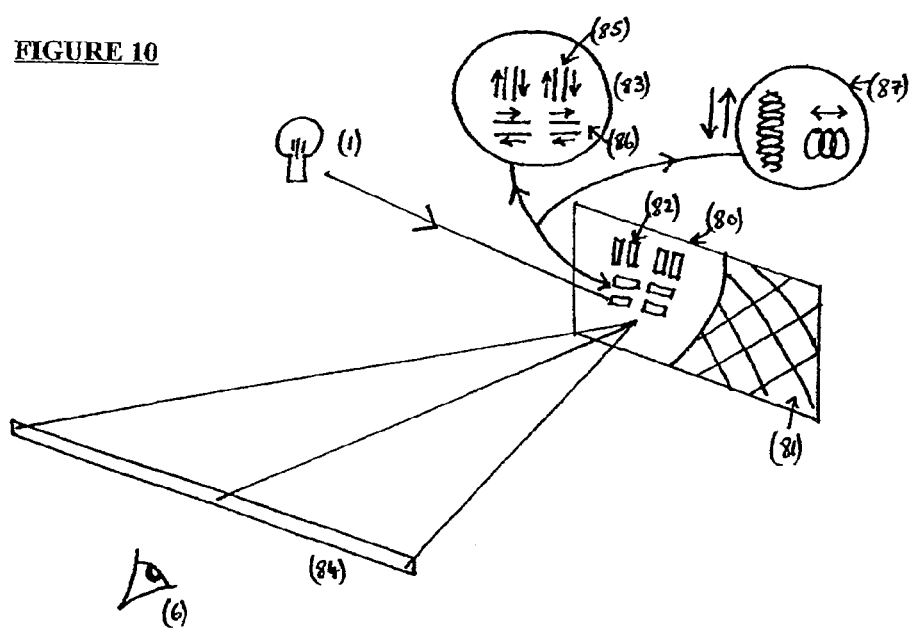

FIG. 10 illustrates how several small areas of such devices (85,86,87) can be combined together within a typical security diffractive design (80,81) to produce a complex effect that could be used as an addition 'security panel' (82) area in a design. As shown in the details (86) and (87) this would be formed using several small parallax barriers relatively close to the artwork plane to defines movements on a small scale required due to the small (less than 5 mm) scale of the repeat the parallax barrier sits relatively close to the artwork plane. The image planes graphic could be relatively simple and linear (detail 86) or of complex guilloche security linework (87).

What is claimed is:

1. An optical security device comprising an optical structure arranged to generate a holographic optically variable image which, when illuminated by white light, generates a continuously variable motion effect moving along a predetermined track, and also arranged to generate three images at three separate image planes respectively and comprising:
   a first image plane located at least in proximity to the image plane corresponding to the physical plane of the device which serves to define the image of the predetermined movement track of the apparent motion effect;
   a second image plane situated away from the physical plane of the device and at which is provided a narrow slit image forming a virtual viewing zone and corresponding to a viewing track of an observer when viewing the apparent motion effect;
   and a third image plane at which is provided an image of a parallax barrier.

2. An optical security device as claimed in claim 1, wherein the third image plane is located between the first image plane and the said viewing zone such that light rays traveling from the first image plane to the viewing zone pass through the third image plane so serving to define the viewing track of the motion effect.

3. An optical security device as claimed in claim 1, wherein the third image plane comprises a virtual plane located behind the first image plane of the device.

4. An optical security device as claimed in claim 1, wherein the third image plane is arranged such that the apparent motion effects are in a direction parallel to the longest extent of virtual viewing zone.

5. An optical security device as claimed in claim 1, wherein the third image plane is arranged such that the apparent motion effects are in a direction perpendicular to the longest extent of virtual viewing zone.

6. An optical security device as claimed in claim 1, wherein the third image plane is arranged to be located in a position such that, under white light illumination, it serves to define the viewing zone and motion effect of the optical structure while the third image plane is located at a predetermined distance from the first image plane.

7. An optical security device as claimed in claim 1, wherein the optical structure contains a plurality of diffractive optical structures.

8. An optical security device as claimed in claim 6, wherein the predetermined distance is within the range of 20 mm-25 mm.

9. An optical security device as claimed in claim 6, wherein the predetermined distance is determined by the geometry between the third image plane and the slit image arranged to produce an apparent movement effect.

10. An optical security device as claimed in claim 1, further comprising an artwork feature and a H1 rainbow slit arranged to cooperate with an image plane of the artwork in order to produce the apparent movement effect.

11. An optical security device as claimed in any one of claim 1 to 10 and including a plurality of the said third image planes.

12. An optical security device as claimed in claim 1, wherein the optical structure is provided in combination with a visual diffractive structure.

13. An optical security device as claimed in claim 12, wherein the optical structure comprises a plurality of optical elements associated with a common repeated graphical image.

14. An optical security device as claimed in claim 13, wherein different graphical features of the device are arranged to share the same apparent movement effects.

15. An optical security device as claimed in claim 13 wherein different graphical images are arranged to offer different apparent motion effects.

16. An optical security device as claimed in claim 15, and arranged such that two graphical images are arranged to produce contra-propagating apparent motion effects.

17. An optical security device as claimed in claim 16, wherein the optical structure comprises a plurality of optical elements defined as linear regions and each exhibiting different characteristics.

18. An optical security device as claimed in claim 17 wherein the linear regions are at least partially curved in shape.

19. An optical security device as claimed in claim 17, wherein the linear regions are in the form of alpha-numeric character shapes.

20. An optical security device as claimed in claim 13 arranged to provide increased crumple resistance for use on security documents.

21. An optical security device as claimed in claim 1, wherein the optical device is provided integrally with a security hologram device.

22. An optical security device as claimed in claim 1, wherein the optical structure comprises a diffractive optical structure in the form of a surface relief structure.

23. An optical security device as claimed in claim 22, wherein the surface relief structure is reflective, the reflective layer being a metal.

24. An optical security device as claimed in claim 22 wherein the optical structure is coated with one or more dielectric layers to provide a semi-transparent reflective layer.

* * * * *